United States Patent [19]
Kamioka

[11] Patent Number: 5,448,539
[45] Date of Patent: Sep. 5, 1995

[54] OPTICAL RECORDING AND REPRODUCING APPARATUS

[75] Inventor: Yuuichi Kamioka, Osaka, Japan

[73] Assignee: Matsushita Electric Industrial Co., Ltd., Osaka, Japan

[21] Appl. No.: 153,515

[22] Filed: Nov. 17, 1993

[30] Foreign Application Priority Data

Nov. 18, 1992 [JP] Japan ................... 4-308548

[51] Int. Cl.⁶ ............................................. G11B 17/22
[52] U.S. Cl. ........................................ 369/32; 369/47
[58] Field of Search ............. 369/32, 33, 44.28, 44.11, 369/43, 49, 47, 44.37; 360/86, 87, 101, 106, 78.04

[56] References Cited

U.S. PATENT DOCUMENTS

| 4,972,396 | 11/1990 | Rafner | 369/32 |
|---|---|---|---|
| 5,111,345 | 5/1992 | Muller | 369/32 |

FOREIGN PATENT DOCUMENTS

| 273384 | 7/1988 | European Pat. Off. | 369/32 |
|---|---|---|---|
| 0372365 | 6/1990 | European Pat. Off. | |
| 0410704 | 1/1991 | European Pat. Off. | |
| 0506447 | 9/1992 | European Pat. Off. | |
| 61-187168 | 8/1986 | Japan . | |
| 62-84441 | 4/1987 | Japan . | |
| 62-92293 | 4/1987 | Japan | 369/32 |
| 62-141601 | 6/1987 | Japan | 369/32 |
| 1151075 | 6/1989 | Japan | 369/32 |
| 281383 | 3/1990 | Japan . | |
| 3263672 | 11/1991 | Japan . | |

Primary Examiner—Georgia Y. Epps
Assistant Examiner—Tan Dinh
Attorney, Agent, or Firm—Lowe, Price, LeBlanc & Becker

[57] ABSTRACT

An optical recording and reproducing apparatus provided with a plurality of sets of optical heads each for recording data, which is obtained by dividing a sequence of video and audio data correspondingly of optical heads of each set, on an optical disk and reproducing such data therefrom at a high transfer rate. These sets of optical heads operate independently of each other. While one set of optical heads is recording or reproducing data on or from one set of regions of the disk, the other set of heads stands by on another set of regions and begins to record or play back immediately upon termination of recording or playback by the first set, to provide continuous recording and reproduction. The other set of heads preferably stand by on the leading address of the other set of regions. Thus, special recording and reproducing operations such as a simultaneous recording and reproducing and a continuous recording and reproducing can be performed by a single optical recording and reproducing apparatus using an optical disk.

18 Claims, 9 Drawing Sheets

REGION c

☐ REGION d

| RECORDING PERMISSION SIGNAL CORRES. TO MAIN HEAD GROUP |  |
|---|---|
| RECORDING PERMISSION SIGNAL CORRES. TO SUB-HEAD GROUP |  |
| REPRODUCING PERMISSION SIGNAL CORRES. TO MAIN HEAD GROUP |  H |
| REPRODUCING PERMISSION SIGNAL CORRES. TO SUB-HEAD GROUP |  H' |
| STATE OF OPTICAL HEADS OF MAIN HEAD GROUP |  |
| STATE OF OPTICAL HEADS OF SUB-HEAD GROUP |  |

RECORDING PERMISSION SIGNAL CORRES. TO MAIN HEAD GROUP — H

RECORDING PERMISSION SIGNAL CORRES. TO SUB-HEAD GROUP — H

REPRODUCING PERMISSION SIGNAL CORRES. TO MAIN HEAD GROUP

REPRODUCING PERMISSION SIGNAL CORRES. TO SUB-HEAD GROUP

STATE OF OPTICAL HEADS OF MAIN HEAD GROUP

STATE OF OPTICAL HEADS OF SUB-HEAD GROUP

REGION g

REGION h

RECORDING PERMISSION SIGNAL CORRES. TO MAIN HEAD GROUP

RECORDING PERMISSION SIGNAL CORRES. TO SUB-HEAD GROUP

REPRODUCING PERMISSION SIGNAL CORRES. TO MAIN HEAD GROUP

REPRODUCING PERMISSION SIGNAL CORRES. TO SUB-HEAD GROUP

STATE OF OPTICAL HEADS OF MAIN HEAD GROUP

STATE OF OPTICAL HEADS OF SUB-HEAD GROUP

▨ REGION i

☐ REGION j

| | |
|---|---|
| RECORDING PERMISSION SIGNAL CORRES. TO MAIN HEAD GROUP |  L |
| RECORDING PERMISSION SIGNAL CORRES. TO SUB-HEAD GROUP |  L |
| REPRODUCING PERMISSION SIGNAL CORRES. TO MAIN HEAD GROUP |  H |
| REPRODUCING PERMISSION SIGNAL CORRES. TO SUB-HEAD GROUP |  H |
| STATE OF OPTICAL HEADS OF MAIN HEAD GROUP |  |
| STATE OF OPTICAL HEADS OF SUB-HEAD GROUP |  |

| RECORDING PERMISSION SIGNAL CORRES. TO MAIN HEAD GROUP | ————————H |
| RECORDING PERMISSION SIGNAL CORRES. TO SUB-HEAD GROUP | ————————H |
| REPRODUCING PERMISSION SIGNAL CORRES. TO MAIN HEAD GROUP | |
| REPRODUCING PERMISSION SIGNAL CORRES. TO SUB-HEAD GROUP | |
| STATE OF OPTICAL HEADS OF MAIN HEAD GROUP | S / / / P / / / |
| STATE OF OPTICAL HEADS OF SUB-HEAD GROUP | S / / / P / / / |

REGION m

RECORDING PERMISSION SIGNAL CORRES. TO MAIN HEAD GROUP

RECORDING PERMISSION SIGNAL CORRES. TO SUB-HEAD GROUP

REPRODUCING PERMISSION SIGNAL CORRES. TO MAIN HEAD GROUP

REPRODUCING PERMISSION SIGNAL CORRES. TO SUB-HEAD GROUP

STATE OF OPTICAL HEADS OF MAIN HEAD GROUP

STATE OF OPTICAL HEADS OF SUB-HEAD GROUP

FIG. 15

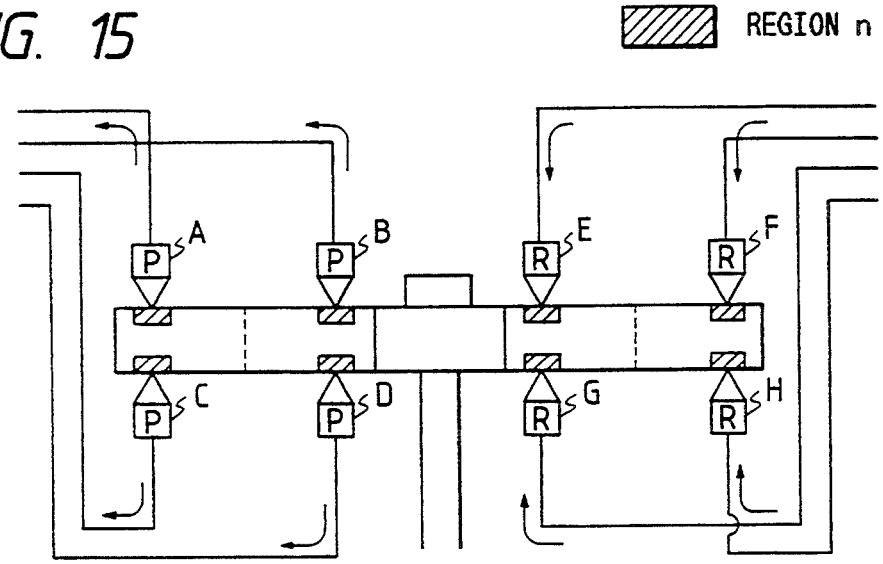 REGION n

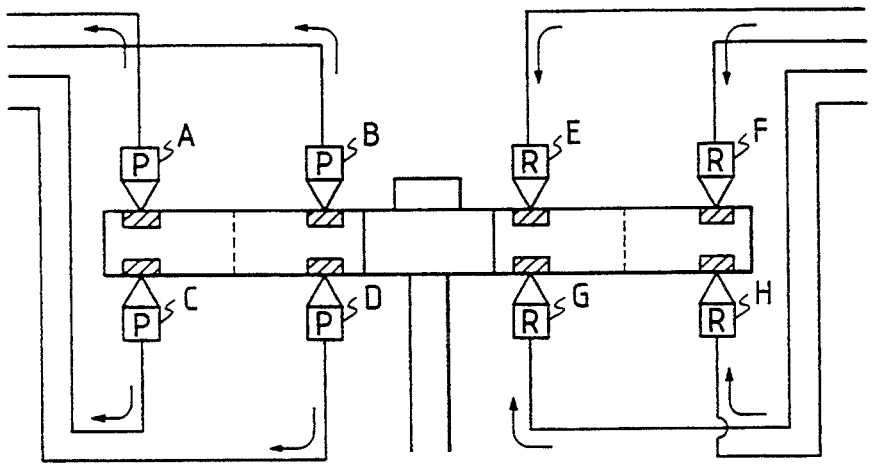

FIG. 16

| | |
|---|---|
| RECORDING PERMISSION SIGNAL CORRES. TO MAIN HEAD GROUP | ─────────────── H |
| RECORDING PERMISSION SIGNAL CORRES. TO SUB-HEAD GROUP | ──────┐_____ |
| REPRODUCING PERMISSION SIGNAL CORRES. TO MAIN HEAD GROUP | ───┐_____ |
| REPRODUCING PERMISSION SIGNAL CORRES. TO SUB-HEAD GROUP | ─────────────── H |
| STATE OF OPTICAL HEADS OF MAIN HEAD GROUP | ////P//////// |
| STATE OF OPTICAL HEADS OF SUB-HEAD GROUP | ////R//////// |

OPTICAL RECORDING AND REPRODUCING APPARATUS

BACKGROUND OF THE INVENTION

1. Field of The Invention

This invention relates to an optical recording and reproducing apparatus for recording a video signal and/or an audio signal on an optical disk and reproducing the video signal and/or the audio signal therefrom.

2. Description of The Related Art

Conventionally, an editing operation is performed by using a digital video tape recorder (VTR) in a broadcasting studio or the like in general. However, the efficiency in editing is considerably increased by using an optical disk, which excels in quickness of random access and retrieval of data, in stead of a VTR. A conventional optical recording and reproducing apparatus using an optical disk is provided with a single optical head and thus has a defect in that it is difficult for this conventional apparatus to handle high-speed transfer rate data obtained at the time of producing digital video signals. To eliminate this defect, a mass-data recording and reproducing system employing a plurality of optical heads has been devised as described in, for instance, Japanese Patent Application Laying-open Publication (Tokkyo Kokai Koho) Official Gazette No. S62-84441. However, the plurality of optical heads handles only sequences of video and audio data. Further, the conventional apparatus cannot achieve a continuous recording, a continuous reproducing, simultaneous recording and reproducing, a simultaneous recording, a simultaneous reproducing, what is called a following recording and what is called a following reproducing to be performed on an optical disk by handling a plurality of data by a group of independent heads utilizing multiple access which is another advantage of an optical disk.

The present invention is accomplished to eliminate the drawbacks of the conventional apparatus.

It is, therefore, an object of the present invention to provide an optical recording and reproducing apparatus which can record and reproduce a plurality of video and audio digital data on an optical disk and can realize a continuous recording, a continuous reproducing, a simultaneous recording, a simultaneous reproducing, what is called a following recording, what is called a following reproducing and simultaneous recording and reproducing, which are effective for editing operations in a broadcasting studio or the like.

SUMMARY OF THE INVENTION

To achieve the foregoing object, in accordance with an aspect of the present invention, there is provided a recording and reproducing apparatus having N sets of M optical heads for recording and reproducing video and/or audio signals (incidentally, M is a natural number; and N is a natural number each greater than or equal to 2). Further, a sequence of video and audio data can be recorded and reproduced only by one set of M optical heads. Moreover, N sets of the optical heads can operate independently of one another. The sequence of video and audio data are divided into parts thereof corresponding to M optical heads, respectively, which are then recorded and reproduced on an optical disk. Thereby, the data can be recorded on or reproduced from the optical disk at a high transfer rate.

With the above described configuration, simultaneously with the termination of recording of data, which is effected by sets of optical heads (namely, preceding sets of optical heads), the other sets of optical heads (namely, following sets (or later sets) of optical heads) start recording data. Thus, a continuous recording can be realized. Similarly, in case where following sets of optical heads start reproducing data simultaneously with the termination of reproducing of data, which is effected by preceding sets of optical heads, a continuous reproducing can be realized. In both cases, while the preceding sets of optical heads are recording or reproducing data on or from M regions of the optical disk, the other sets of optical heads stands by on another set of M regions. In a specific embodiment, the other sets of optical heads stand by on a leading address of the other set of M regions. Further, in case where a plurality of sets of optical heads record data on different regions of an optical disk simultaneously, a simultaneous recording can be achieved. Similarly, in case where a plurality of sets of optical heads reproduce data from different regions of an optical disk simultaneously, a simultaneous reproducing can be achieved. In case where data being reproduced by a set of optical heads from a region of an optical disk is recorded by another following set of optical heads, what is called a following recording can be realized. Conversely, in case where data being recorded by a set of optical heads from a region of an optical disk is reproduced by another following set of optical heads, what is called a following reproducing can be realized. Furthermore, in case that when data is being recorded on a region of an optical disk by a set of optical heads, another data is reproduced by another set of optical heads simultaneously, a simultaneous recording and reproducing can be realized.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which:

FIG. 15 is a diagram for illustrating the arrangement of optical heads of the optical recording and reproducing apparatus of the present invention at the time of performing a following recording by the embodiment of the present invention; and FIG. 16 is a timing chart for illustrating control signals and an operation of an optical head at the time of performing a following recording by the embodiment of the present invention.

DETAILED DESCRIPTION OF THE PREFERRED EMBODIMENT

Hereinafter, the preferred embodiment of the present invention will be described in detail by referring to the accompanying drawings.

This embodiment is an optical recording and reproducing apparatus having 2 sets of 4 optical heads (namely, M=4, N=2).

Figure 1:
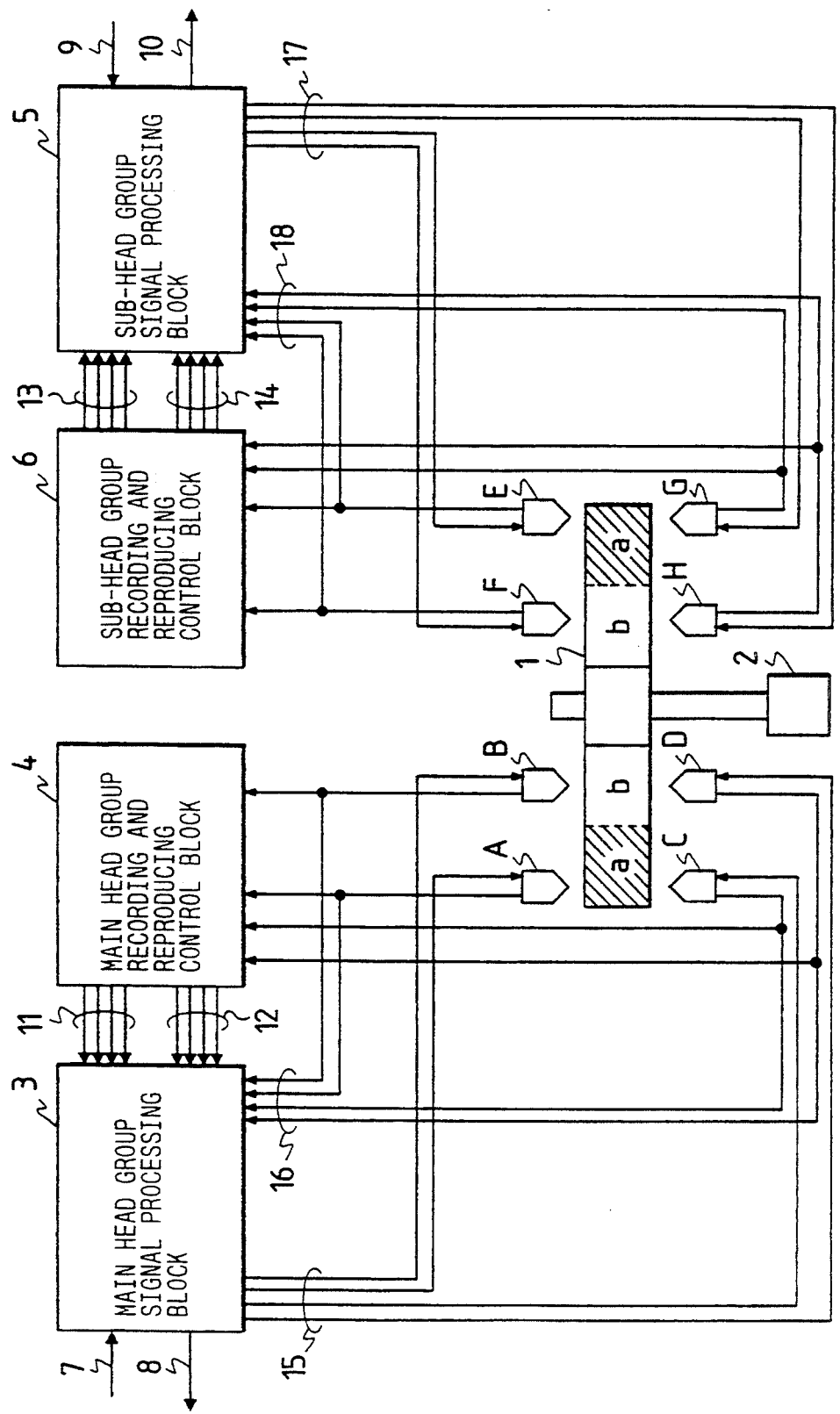
FIG. 1 is a schematic block diagram for illustrating the configuration of an embodiment of the present invention, namely, an optical recording and reproducing apparatus embodying the present invention.
Figure 2:
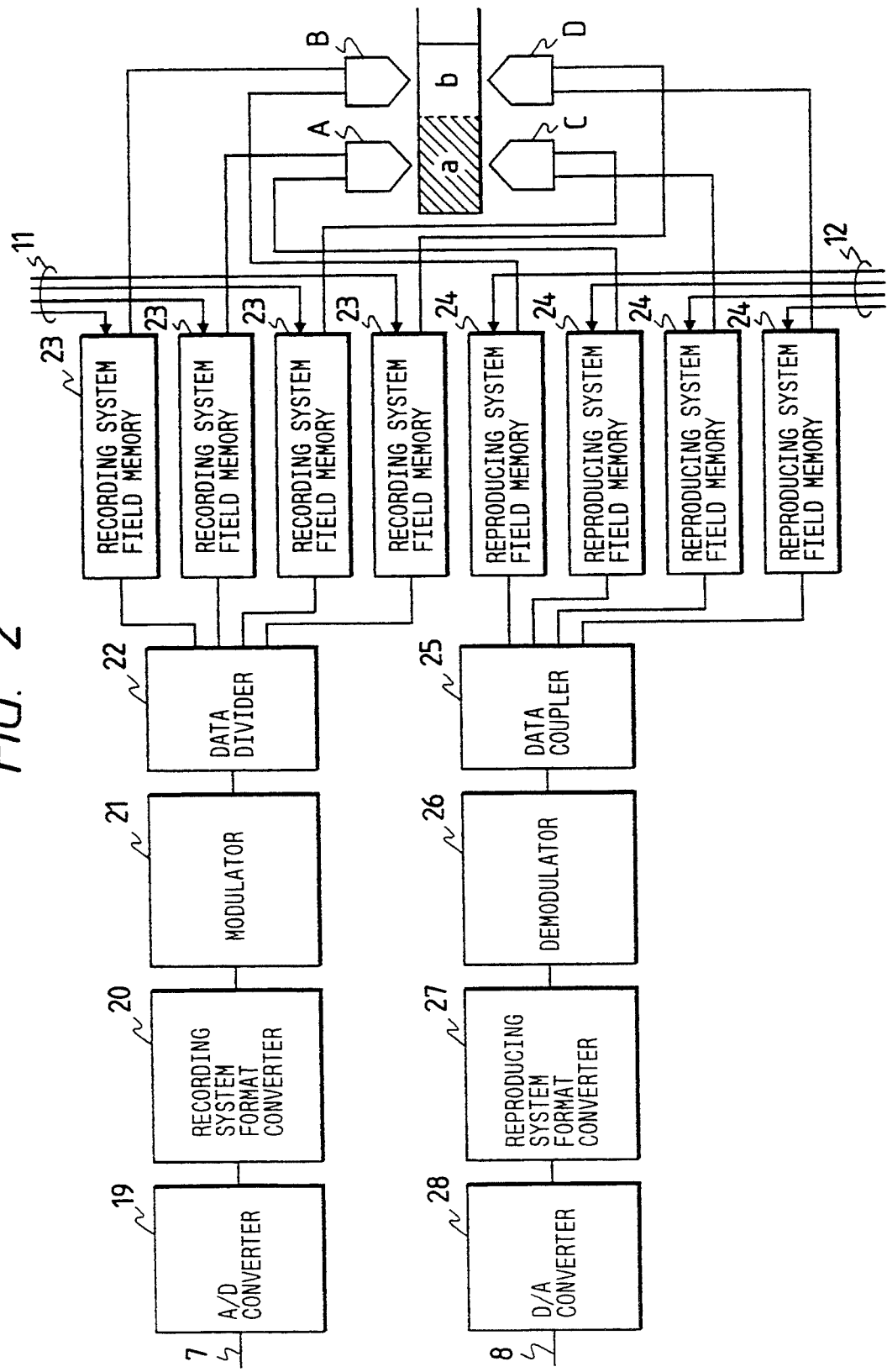
FIG. 2 is a schematic block diagram for illustrating the configuration of a signal processing block of the optical recording and reproducing apparatus of FIG. 1.

FIG. 1 schematically illustrates the configuration of this apparatus. An optical disk 1 is rotated around the axis of rotation thereof at the time of recording and reproducing data by a disk motor 2. The optical disk 1 is partitioned into an outer circular portion a and an inner circular portion b. Further, an optical head A is used to record data on and reproduce data from the top surface of the outer circular portion a. Moreover, an optical head B is used to record data on and reproduce data from the top surface of the inner circular portion b. Furthermore, an optical head C is used to record data on and reproduce data from the bottom surface of the outer circular portion a. Additionally, an optical head D is used to record data on and reproduce data from the bottom surface of the inner circular portion b. Hereunder, this group of optical heads A, B, C and D will be referred to as a main head group. Similarly, the group of optical heads E, F, G and H will be referred to as a sub-head group. Further, an optical head E is used to record data on and reproduce data from the top surface of the outer circular portion a. Moreover, an optical head F is used to record data on and reproduce data from the top surface of the inner circular portion b. Furthermore, an optical head G is used to record data on and reproduce data from the bottom surface of the outer circular portion a. Additionally, an optical head H is used to record data on and reproduce data from the bottom surface of the inner circular portion b. In case where video and audio signals input from an external circuit (namely, input signals) are recorded on the optical disk by using an optical head of the main head group, the input signal 7 is first input to a main head group signal processing block 3. FIG. 2 illustrates the configuration of the main head group signal processing block 3. The input signal 7 is first converted by an analog-to-digital (A/D) converter 19 to a digital signal. Then, the digital signal is converted by a format converter 20 in such a manner to have a data format for an optical disk. Next, this signal is modulated by a modulator 21 in accordance with a modulation method suited to a recording of data on an optical disk. Further, a sequence of video and audio data are divided by a data divider 22 into components corresponding to the optical heads A, B, C and D and these components are once written to a recording system field memory 23. Thereafter, a reading of the data written to the field memory is commenced in response to a recording permission signal 11 corresponding to each optical head, which signal is sent from a main head group recording and reproducing control block 4 of FIG. 1. Thus, the data is recorded on the optical disk through the optical heads A, B, C and D. Incidentally, the description of the mechanism (not shown) for moving the heads is omitted for simplicity of description.

At the time of reproducing data, data read from the optical disk in response to a reproducing permission signal 12 sent from the main head group recording and reproducing control block 4 of FIG. 1 to each optical head is written to a reproducing system field memory 24. The data written to this field memory are read in synchronization with each other and are then coupled (namely, synthesized) by a data coupler 25 as a sequence of video and audio data which is then demodulated by a demodulator 26. Further, the modulated data is converted by a format converter 27 in such a way to have a format for reproduction. Then, the converted signal is converted by a digital-to-analog (D/A) converter 28 as an analog signal and this analog signal is further output to an external circuit as an output signal 8.

Thus, the writing of recording data (namely, data to be recorded on the optical disk) thereto, as well as the reading of the written data, is effected by dividing the data into 4 parts corresponding to 4 optical heads, respectively, and using the optical heads. Thereby, the recording and reproducing of video and audio signals can be performed at a high transfer rate. Similarly, in case of the sub-head group, at the time of recording data, an input signal 9 is input to a sub-head group signal processing block 5. Then, data represented by the input signal is recorded in response to a recording permission signal 13 sent from the sub-head group recording and reproducing control block 6 by using the optical heads E, F, G and H. Further, at the time of reproducing data, data is read from the optical disk through the optical heads E, F, G and H in response to a reproducing permission signal 14. The read data is output through the sub-head group signal processing block 5 to an external circuit as output data 10.

Incidentally, the configuration of the sub-head group signal processing block 5 is similar to that of the main head signal processing block of FIG. 2.

Figure 3:
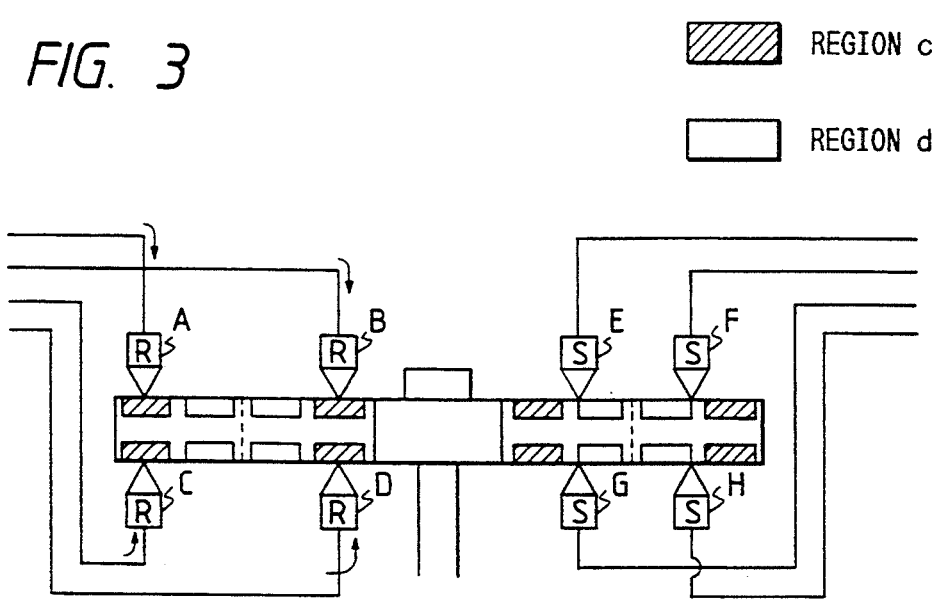
FIG. 3 is a diagram for illustrating the arrangement of optical heads of the optical recording and reproducing apparatus of the present invention at the time of performing a continuous recording by the embodiment of the present invention.
Figure 3:
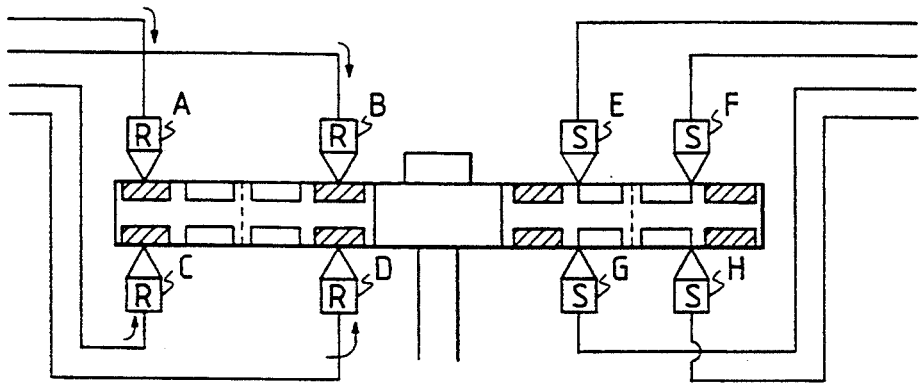

First, an operation of the continuous recording will be described hereinbelow. Here, it is assumed that a sequence of video and audio signals are being recorded on a region c of the optical disk as illustrated in FIG. 3. In the instant application, four regions being present on the top and bottom surfaces of the outer circular portion a and the inner circular portion b, respectively, will be sometimes referred to collectively as a region. In this figure, reference character R indicates an optical head being used to record data.

Figure 4:
FIG. 4 is a timing chart for illustrating control signals and an operation of an optical head at the time of performing a continuous recording by the embodiment of the present invention.
Figure 4:
Figure 4:
Figure 4:
Figure 4:
Figure 4:
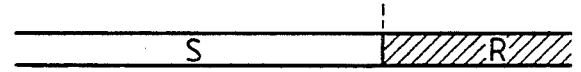

At that time, the optical heads E, F, G and H of the sub-head group stand by at the leading address of the region d. Further, simultaneously with the termination of recording of data by use of the optical heads of the main head group, the next recording operation to be performed on the region d is started by the optical heads of the sub-head group. When the optical heads of the sub-head group are performing the recording operation, the optical heads of the main head group stand by at the leading address of a region on which the next recording operation is performed. In this figure, reference character S indicates an optical head which stands by. Further, an arrow indicates a data flow. FIG. 4 is a timing chart for illustrating an operation of an optical head at the time of performing a continuous recording. The low signal level L of a recording permission signal indicates that data should be recorded on the optical disk. In contrast, the high signal level H of a recording permission signal indicates that the recording of data should be stopped. Further, the low signal level L of a reproducing permission signal indicates that data should be reproduced from the optical disk. In contrast, the high signal level H of a reproducing permission signal indicates that the reproducing of data should be stopped. When the signal level of the recording permission signal corresponding to the optical head of the main head group changes from the low level L to the high level H, the signal level of the recording permission signal corresponding to the optical head of the sub-head group changes from the high level H to the low level L simultaneously. Thereby, an operation to be performed is changed from the recording operation using the optical heads of the main head group to the recording operation using the optical heads of the sub-head group. In case where the recording is performed by using the optical heads of the main head group after the recording to be performed by using the optical heads of the sub-head group is finished, the signal level of the recording permission signal corresponding to the optical head of the sub-head group is changed from the low level L to the high level H and that of the recording permission signal corresponding to the optical head of the main head group is changed from the high level H to the low level L. Thereby, an operation to be performed is changed from the recording operation using the optical heads of the sub-head group to the recording operation using the optical heads of the main head group.

Figure 5:
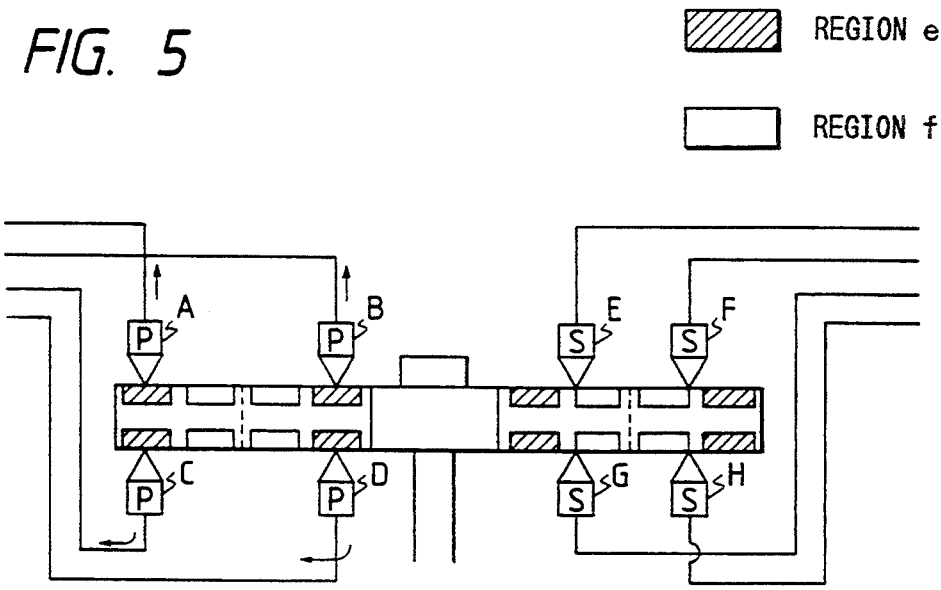
FIG. 5 is a diagram for illustrating the arrangement of optical heads of the optical recording and reproducing apparatus of the present invention at the time of performing a continuous reproducing by the embodiment of the present invention.
Figure 5:
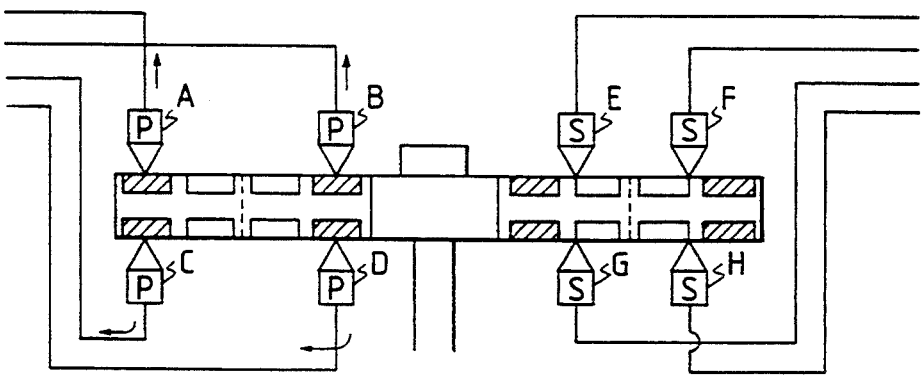
Figure 6:
FIG. 6 is a timing chart for illustrating control signals and an operation of an optical head at the time of performing a continuous reproducing by the embodiment of the present invention.
Figure 6:
Figure 6:
Figure 6:
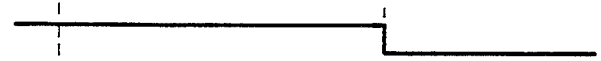
Figure 6:
Figure 6:
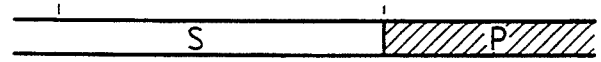

Similarly, in case of the continuous reproduction, as illustrated in FIGS. 5 and 6, when the optical heads A, B, C and D of the main head group are reproducing data from a region e, the optical heads E, F, G and H stand by at the leading address of a region f from which data is next reproduced. In this figure, reference character P indicates an optical head which is being used to reproduce data. The reproducing of data from the region f is started by changing the signal level of the reproducing permission signal, which corresponds to the optical head of the main head group, from the low level L to the high level H and simultaneously stopping the reproduction performed by using the optical heads of the main head group. Further, after the reproduction effected by using the optical heads of the sub-head group is finished, the reproduction to be performed by using the optical heads of the main head group can be carried out.

Figure 7:
FIG. 7 is a diagram for illustrating the arrangement of optical heads of the optical recording and reproducing apparatus of the present invention at the time of performing a simultaneous recording and reproducing by the embodiment of the present invention.
Figure 7:
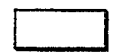
Figure 7:
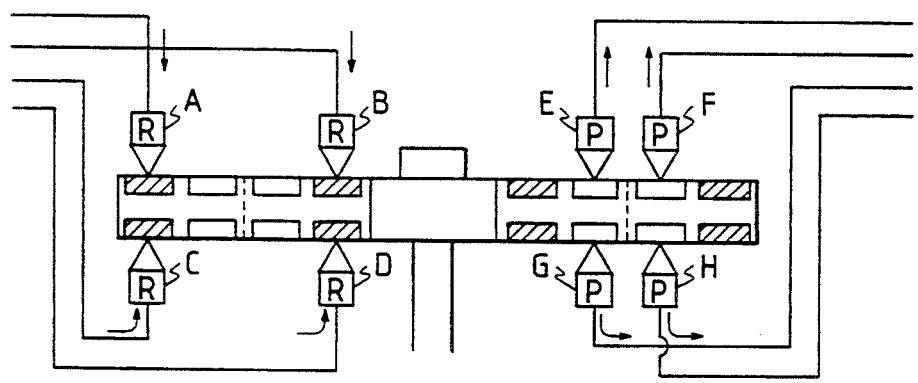
Figure 8:
FIG. 8 is a timing chart for illustrating control signals and an operation of an optical head at the time of performing a simultaneous recording and reproducing by the embodiment of the present invention.
Figure 8:
Figure 8:
Figure 8:
Figure 8:
Figure 8:

In case of the simultaneous recording and reproducing of data, as illustrated in FIG. 7, when data is being recorded on a region g by using the optical heads A, B, C and D of the main head group, the optical heads E, F, G and H of the sub-head group are being used to reproduce data from a region h. FIG. 8 is a timing chart for illustrating such an operation. If both of the signal level of the recording permission signal corresponding to the optical heads of the main head group and the signal level of the reproduction permission signal corresponding to the optical heads of the sub-head group are the low level L, the simultaneous recording and reproducing can be performed.

Figure 9:
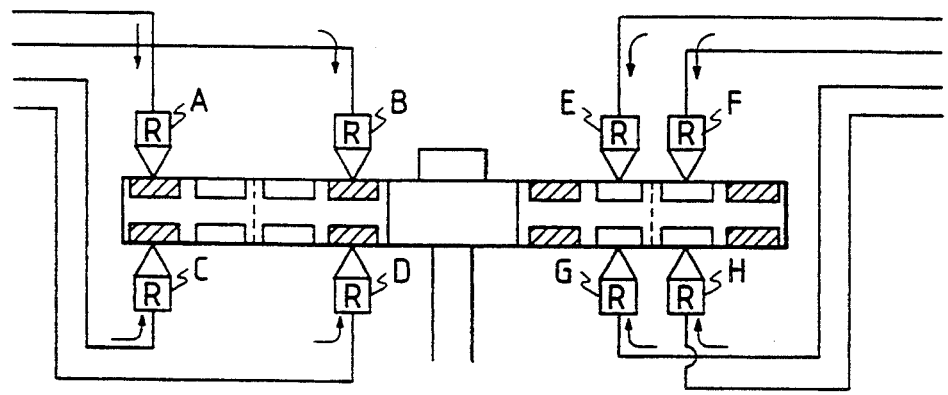
FIG. 9 is a diagram for illustrating the arrangement of optical heads of the optical recording and reproducing apparatus of the present invention at the time of performing a simultaneous recording by the embodiment of the present invention.
Figure 10:
FIG. 10 is a timing chart for illustrating control signals and an operation of an optical head at the time of performing a simultaneous recording by the embodiment of the present invention.
Figure 10:
Figure 10:
Figure 10:
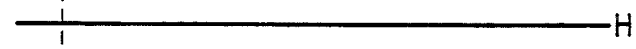
Figure 10:
Figure 10:
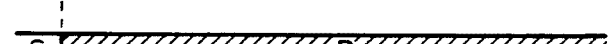

In case of the simultaneous recording, as illustrated in FIG. 9, the optical heads A, B, C and D of the main head group are used to record data on a region i. Simultaneously, the optical heads of the sub-head group are used to record data on a region j. FIG. 10 is a timing chart for illustrating such an operation. As illustrated in this figure, both of the signal level of the recording permission signal corresponding to the optical heads of the main head group and that of the recording permission signal corresponding to the optical heads of the sub-head group are the low level L.

Figures 11, 12:
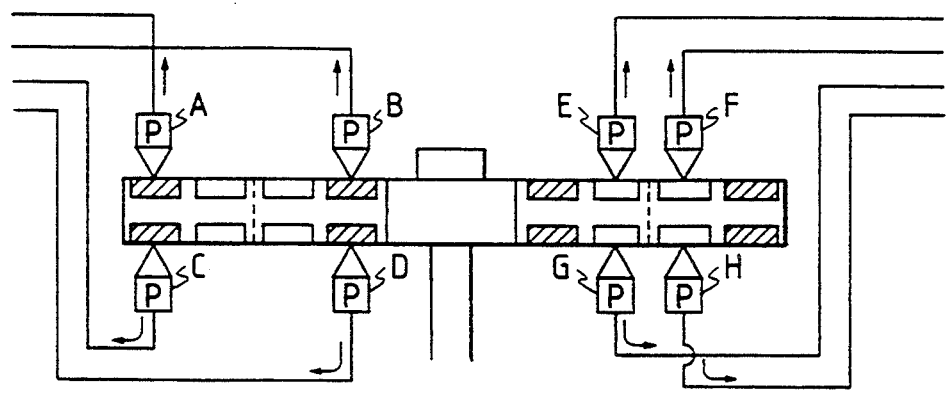
FIG. 11 is a diagram for illustrating the arrangement of optical heads of the optical recording and reproducing apparatus of the present invention at the time of performing a simultaneous reproducing by the embodiment of the present invention.
FIG. 12 is a timing chart for illustrating control signals and an operation of an optical head at the time of performing a simultaneous reproducing by the embodiment of the present invention.

Similarly, in case of the simultaneous reproducing, as illustrated in FIG. 11, both of the optical heads A, B, C and D of the main head group are used to reproduce data from a region k. Simultaneously, the optical heads of the sub-head group are used to reproduce data from a region l. FIG. 12 is a timing chart for illustrating such an operation. As illustrated in this figure, both of the signal level of the reproducing permission signal corresponding to the optical heads of the main head group and that of the recording permission signal corresponding to the optical heads of the sub-head group are the low level L simultaneously.

Figure 13:
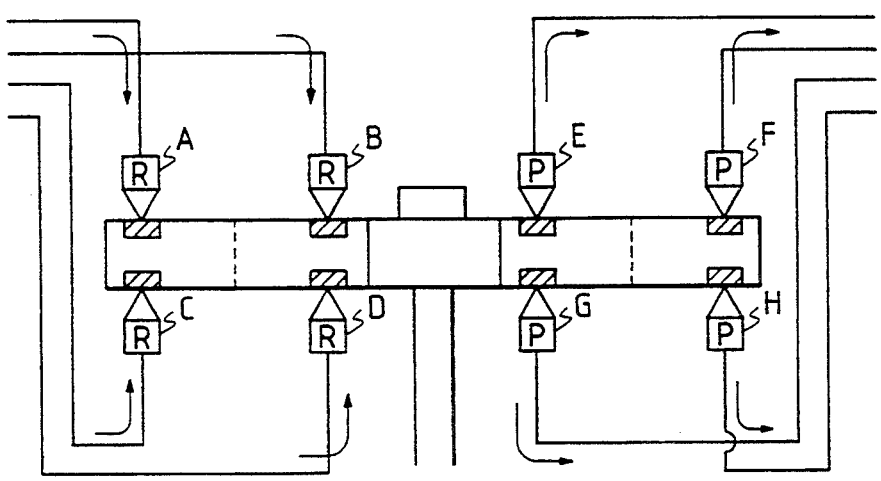
FIG. 13 is a diagram for illustrating the arrangement of optical heads of the optical recording and reproducing apparatus of the present invention at the time of performing a following reproducing by the embodiment of the present invention.
Figure 13:
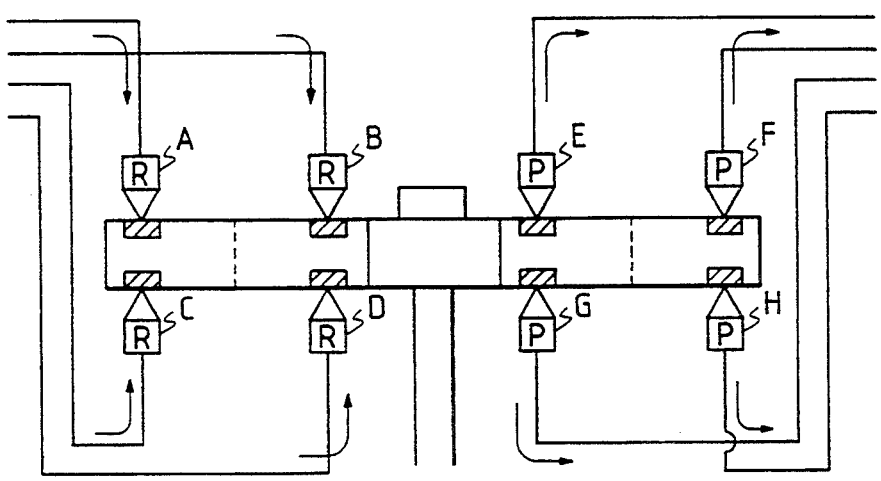
Figure 14:
FIG. 14 is a timing chart for illustrating control signals and an operation of an optical head at the time of performing a following reproducing by the embodiment of the present invention.
Figure 14:
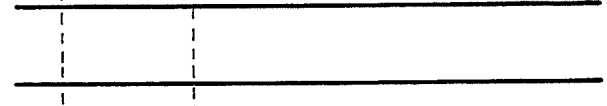
Figure 14:
Figure 14:
Figure 14:
Figure 14:

In case of the following reproducing, as illustrated in FIG. 13, the optical heads of the main head group are used to record data on a region m. At that time, the optical heads of the sub-head group are placed on the region m. Further, there is a time-lag between the recording of video and audio signals recorded by using the optical heads of the main head group and the reproducing thereof effected by using the optical heads of the sub-head group. Thereby, a signal can be reproduced just after the signal is recorded on a region of the optical disk. Conversely, a following reproduction of a signal can be achieved by using the optical heads of the main head group after the signal is recorded by using the optical heads of the sub-head group. FIG. 14 is a timing chart for illustrating a case where a following reproduction of a signal is effected by using the optical heads of the sub-head group after the signal is recorded by using the optical heads of the main head group. As illustrated in this figure, the signal level of the recording permission signal corresponding to the optical heads of the main head group first becomes the low level L and subsequently, after a while, the signal level of the recording permission signal corresponding to the optical heads of the sub-head group becomes the low level L.

In case of the following recording, as illustrated in FIG. 15, when the optical heads of the main head group are used to record data on a region n, the optical heads of the sub-head group are placed on the region n. Further, the optical heads of the sub-head group are used to record data on the region immediately after data is reproduced therefrom by using the optical heads of the main head group. Thereby, a signal reproduced by using the optical heads of the main head group can be processed and can be recorded again on a region of the optical disk if necessary. FIG. 16 is a timing chart for illustrating this case. As illustrated in this figure, the signal level of the reproducing permission signal corresponding to the optical heads of the main head group first becomes the low level L and subsequently, the signal level of the recording permission signal corresponding to the optical heads of the sub-head group becomes the low level L. Thereby, a following recording can be effected. Apparently, the following recording of data can be effected by using the optical heads of the main head group after the reproduction of data is performed by using the optical heads of the sub-head group.

While a preferred embodiment of the present invention has been described above, it is to be understood that the present invention is not limited thereto and that other modifications will be apparent to those skilled in the art without departing from the spirit of the invention. For example, in case of the above described embodiment of the present invention, the apparatus is provided with 2 sets of 4 optical heads. However, the number of sets of optical heads and that of optical heads of each set may be other than 2 and 4, respectively, if necessary.

The scope of the present invention, therefore, is to be determined solely by the appended claims.

What is claimed is:

1. An optical recording and reproducing apparatus having N sets (N is an integer equal to or more than 2) of M optical heads (M is an integer equal to or more than 2), each set of the M optical heads dividing a sequence of input digital video data and/or input digital audio data into parts thereof corresponding to the M optical heads and recording the parts thereof on an optical disk at a high transfer rate, each set of the M optical heads reproducing parts of a sequence of input digital video data and/or input digital audio data and then synthesizing the sequence of the input digital video data and/or the input digital audio data from the parts thereof to thereby reproduce the sequence of the input digital video data and/or the input digital audio data at a high transfer rate, the N sets of the M optical heads recording data on the optical disk independent of each other, the optical recording and reproducing apparatus comprising:

control means for controlling the N sets of the M optical heads such that when a first one of the N sets of the M optical heads record a part of the input digital video data and/or the input digital audio data on a set of M regions of the optical disk, a second one of the N sets of the M optical heads stand by on another set of M regions of the optical disk for next recording another part of the input digital video data and/or the input digital audio data thereon and that the second one of the N sets of the M optical heads start recording immediately after the first one of the N sets of the M optical heads finish recording.

2. An optical recording and reproducing apparatus having N sets (N is an integer equal to or more than 2) of M optical heads (M is an integer equal to or more than 2), each set of the M optical heads dividing a sequence of input digital video data and/or input digital audio data into parts thereof corresponding to the M optical heads and recording the parts thereof on an optical disk at a high transfer rate, each set of the M optical heads reproducing parts of a sequence of input digital video data and/or input digital audio data and then synthesizing the sequence of the input digital video data and/or the input digital audio data from the parts thereof to thereby reproduce the sequence of the input digital video data and/or the input digital audio data at a high transfer rate, the N sets of the M optical heads recording data on the optical disk independent of each other, the optical recording and reproducing apparatus comprising:

control means for controlling the N sets of the M optical heads such that when a first one of the N sets of the M optical heads reproduce first digital video data and/or digital audio data from a first set of M regions of the optical disk, a second one of the N sets of the M optical heads stand by on a second set of M regions of the optical disk for next reproducing second digital video and/or digital audio data therefrom and that the second one of the N sets of the M optical heads start reproducing the second digital video data and/or the second digital audio data from the second set of M regions of the optical disk immediately after the first one of the N sets of the M optical heads finish reproducing.

3. An optical recording and reproducing apparatus having N sets (N is an integer equal to or more than 2) of M optical heads (M is an integer equal to or more than 2), each set of the M optical heads dividing a sequence of input digital video data and/or input digital audio data into parts thereof corresponding to the M optical heads and recording the parts thereof on an optical disk at a high transfer rate, each set of the M optical heads reproducing parts of a sequence of input digital video data and/or input digital audio data and then synthesizing the sequence of the input digital video data and/or the input digital audio data from the parts thereof to thereby reproduce the sequence of the input digital video data and/or the input digital audio data at a high transfer rate, the N sets of the M optical heads recording data on the optical disk independent of each other, the optical recording and reproducing apparatus comprising:

control means for controlling the N sets of the M optical heads such that when a first one of the N sets of the M optical heads record digital video data and/or digital audio data on a set of M regions of the optical disk, a second one of the N sets of the M optical heads reproduce digital video and/or digital audio data from another set of M regions of the optical disk.

4. An optical recording and reproducing apparatus having N sets (N is an integer equal to or more than 2)

of M optical heads (M is an integer equal to or more than 2), each set of the M optical heads dividing a sequence of input digital video data and/or input digital audio data into parts thereof corresponding to the M optical heads and recording the parts thereof on an optical disk at a high transfer rate, each set of the M optical heads reproducing parts of a sequence of input digital video data and/or input digital audio data and then synthesizing the sequence of the input digital video data and/or the input digital audio data from the parts thereof to thereby reproduce the sequence of the input digital video data and/or the input digital audio data at a high transfer rate, the N sets of the M optical heads recording data on the optical disk independent of each other, the optical recording and reproducing apparatus comprising:

control means for controlling the N sets of the M optical heads such that among the N sets of the M optical heads R sets (R is a natural number equal to or less than N) of the N sets of the M optical heads simultaneously record digital video data and/or digital audio data on R different regions of the optical disk, respectively.

5. An optical recording and reproducing apparatus having N sets (N is an integer equal to or more than 2) of M optical heads (M is an integer equal to or more than 2), each set of the M optical heads dividing a sequence of input digital video data and/or input digital audio data into parts thereof corresponding to the M optical heads and recording the parts thereof on an optical disk at a high transfer rate, each set of the M optical heads reproducing parts of a sequence of input digital video data and/or input digital audio data and then synthesizing the sequence of the input digital video data and/or the input digital audio data from the parts thereof to thereby reproduce the sequence of the input digital video data and/or the input digital audio data at a high transfer rate, the N sets of the M optical heads recording data on the optical disk independent of each other, the optical recording and reproducing apparatus comprising:

control means for controlling the N sets of the M optical heads such that among the N sets of the M optical heads, R sets (R is a natural number equal to or less than N) of the N sets of the M optical heads simultaneously reproduce digital video data and/or digital audio data from R different regions of the optical disk, respectively.

6. An optical recording and reproducing apparatus having N sets (N is an integer equal to or more than 2) of M optical heads (M is an integer equal to or more than 2), each set of the M optical heads dividing a sequence of input digital video data and/or input digital audio data into parts thereof corresponding to the M optical heads and recording the parts thereof on an optical disk at a high transfer rate, each set of the M optical heads reproducing parts of a sequence of input digital video data and/or input digital audio data and then synthesizing the sequence of the input digital video data and/or the input digital audio data from the parts thereof to thereby reproduce the sequence of the input digital video data and/or the input digital audio data at a high transfer rate, the N sets of the M optical heads recording data on the optical disk independent of each other, the optical recording and reproducing apparatus comprising:

control means for controlling the N sets of the M optical heads such that while a first one of the N sets of the M optical heads record digital video data and/or digital audio data on M regions of the optical disks, a second one of the N sets of the M optical heads reproduce the recorded digital video data and/or digital audio data from the M regions of the optical disk a predetermined time later.

7. An optical recording and reproducing apparatus having N sets (N is an integer equal to or more than 2) of M optical heads (M is an integer equal to or more than 2), each set of the M optical heads dividing a sequence of input digital video data and/or input digital audio data into parts thereof corresponding to the M optical heads and recording the parts thereof on an optical disk at a high transfer rate, each set of the M optical heads reproducing parts of a sequence of input digital video data and/or input digital audio data and then synthesizing the sequence of the input digital video data and/or the input digital audio data from the parts thereof to thereby reproduce the sequence of the input digital video data and/or the input digital audio data at a high transfer rate, the N sets of the M optical heads recording data on the optical disk independent of each other, the optical recording and reproducing apparatus comprising:

control means for controlling the N sets of the M optical heads such that while a first one of the N sets of the M optical heads reproduce digital video data and/or digital audio data on M regions of the optical disk, a second one of the N sets of the M optical heads record digital video data and/or digital audio data from the M regions of the optical disk a predetermined time later.

8. The optical recording and reproducing apparatus according to claim 1, wherein the M optical heads of each set are positioned on a top surface and a bottom surface of the optical disk to record digital video data and/or digital audio data on the top surface and the bottom surface thereof.

9. The optical recording and reproducing apparatus according to claim 2, wherein the M optical heads of each set are positioned on a top surface and a bottom surface of the optical disk to record digital video data and/or digital audio data on the top surface and the bottom surface thereof.

10. The optical recording and reproducing apparatus according to claim 3, wherein the M optical heads of each set are positioned on a top surface and a bottom surface of the optical disk to record digital video data and/or digital audio data the top surface and the bottom surface thereof.

11. The optical recording and reproducing apparatus according to claim 4, wherein the M optical heads of each set are positioned on a top surface and a bottom surface of the optical disk to record digital video data and/or digital audio data on the top surface and the bottom surface thereof.

12. The optical recording and reproducing apparatus according to claim 5, wherein the M optical heads of each set are positioned on a top surface and a bottom surface of the optical disk to record digital video data and/or digital audio data on the top surface and the bottom surface thereof.

13. The optical recording and reproducing apparatus according to claim 6, wherein the M optical heads of each set are positioned on a top surface and a bottom surface of the optical disk to record digital video data and/or digital audio data on the top surface and the bottom surface thereof.

14. The optical recording and reproducing apparatus according to claim 7, wherein the M optical heads of each set are positioned on a top surface and a bottom surface of the optical disk to record digital video data and/or digital audio data on the top surface and the bottom surface thereof.

15. The optical recording and reproducing apparatus according to claim 1, wherein said M optical heads of said second one of the N sets are positioned on a leading address of said another set of M regions while standing by when said first one of the N sets of the M optical heads record said part of the input digital video data and/or the input digital audio data on said set of M regions.

16. The optical recording and reproducing apparatus according to claim 15, wherein said control means controls generation of control signals for controlling said optical heads of said second one of the N sets to start recording said another part of the input digital video data and/or the input digital audio data immediately after said first one of the N sets of optical heads finish recording.

17. The optical recording and reproducing apparatus according to claim 2, wherein said M optical heads of said second one of the N sets stand by on a leading address of said second set of M regions while said first one of the N sets of the M optical heads reproduce said first digital video data and/or digital audio data from said first set of M regions of the optical disk.

18. The optical recording and reproducing apparatus according to claim 17, wherein said control means controls generation of control signals for controlling said optical heads of said second one of the N sets to start reproducing said second digital video data and/or digital audio data immediately after said first one of the N sets of optical heads finish reproducing.

* * * * *